No. 646,973. Patented Apr. 10, 1900.
E. E. FREDERICK.
VALVE.
(Application filed July 19, 1898.)
(No Model.) 2 Sheets—Sheet 1.
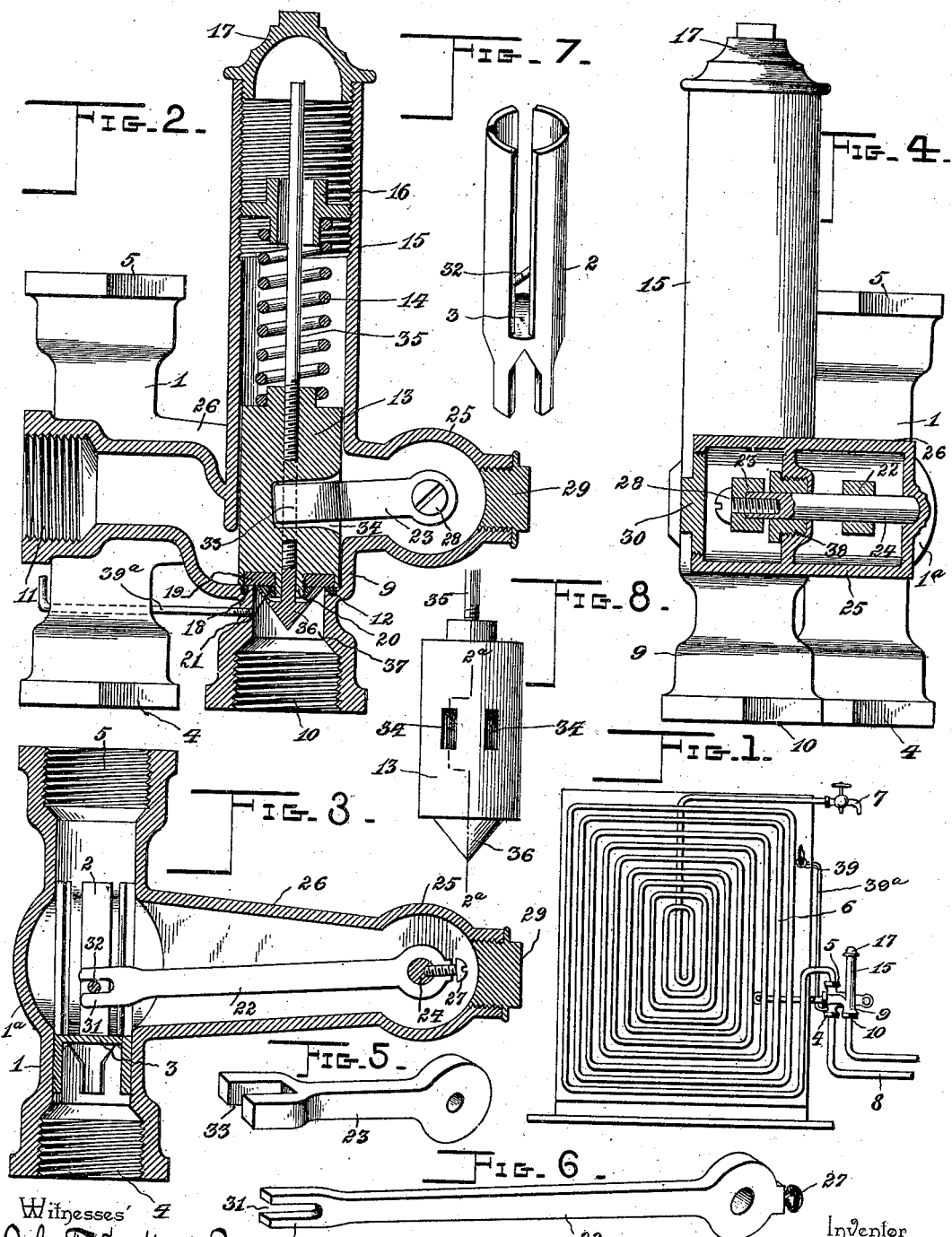
Witnesses: John F. Deufferwiel
Inventor Edwin E. Frederick,
By his Attorneys, C. A. Snow & Co.

No. 646,973.
E. E. FREDERICK.
VALVE.
(Application filed July 19, 1898.)
(No Model.)
Patented Apr. 10, 1900.
2 Sheets—Sheet 2.
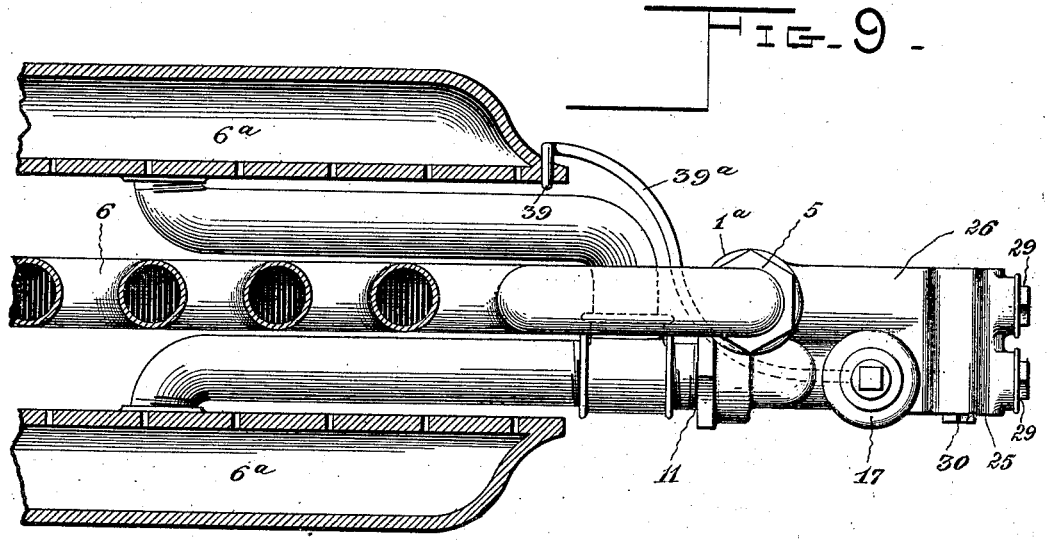
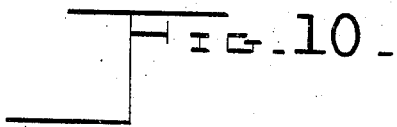
Witnesses
John F. Deufferwiel
O. B. Boyle
Edwin E. Frederick, Inventor
By his Attorneys,
C. A. Snow & Co.

UNITED STATES PATENT OFFICE.

EDWIN ELMER FREDERICK, OF AVALON, PENNSYLVANIA, ASSIGNOR, BY DIRECT AND MESNE ASSIGNMENTS, OF ONE-HALF TO THE UNION BURNER COMPANY AND HENRY PURINTON, OF PITTSBURG, PENNSYLVANIA.

VALVE.

SPECIFICATION forming part of Letters Patent No. 646,973, dated April 10, 1900.

Application filed July 19, 1898. Serial No. 686,360. (No model.)

*To all whom it may concern:*

Be it known that I, EDWIN ELMER FREDERICK, a citizen of the United States, residing at Avalon, in the county of Allegheny and State of Pennsylvania, have invented a new and useful Valve, of which the following is a specification.

My invention relates to a regulating-valve adapted for use particularly in connection with water-heaters wherein water is heated by gas during the passage of the former through a conveyer exposed to the gas-flame and wherein it is desirable to admit gas to the heater only during the drawing of water therefrom, whereby the water is heated only as required.

One object of my invention is to provide a controlling or regulating device whereby the opening of a faucet in the water service-pipe to allow a flow of water from the heater is accompanied by the admission of gas to the heater, whereby as the water passes through the heater its temperature is raised to the desired degree.

In carrying out my invention I employ connected water and gas valves so related that when the obstacle to the forward movement of the water through the service-pipe is removed, as by the opening of a faucet, both valves will be unseated to allow a simultaneous flow of water and gas, and by employing a pilot-flame which is constantly supplied, and hence is kept continuously burning, it is obvious that the apparatus, by means of a controlling-valve such as that indicated, may remain inoperative when no water is required, but will be thrown into operation promptly upon the opening of an outlet-controlling faucet.

A further object of my invention is to provide a valve mechanism wherein the friction due to the relative movements of the parts is reduced to the minimum, whereby the prompt operation of the several parts is accomplished by a light as well as by a heavy water-pressure; also, an object of my invention is to provide means for regulating the flow of gas when the gas-valve is open with relation to the flow of water, whereby an accurate coöperation of the parts is insured.

Further objects and advantages of this invention will appear in the following description and the novel features thereof will be particularly pointed out in the appended claims.

In the drawings, Figure 1 is a diagrammatic view of a water-heating apparatus, in connection with which is arranged a controlling-valve constructed in accordance with my invention, the heater proper, which I have illustrated, forming no part of my invention, but being shown and described in an application for patent filed by P. F. McCaffrey of even date herewith. Fig. 2 is a sectional view of the valve mechanism, taken in the plane of the gas-valve and the gas inlet and outlet passages, the plane upon which the fluid-controlling valve is cut being indicated by the line $2^a$ $2^a$ of Fig. 8. Fig. 3 is a similar view taken in the plane of the plunger or water-valve and the water inlet and outlet passages. Fig. 4 is a transverse section in the plane of the spindle of the connecting-lever. Figs. 5 and 6 are detail views in perspective of the lever-arms detached. Fig. 7 is a detail view of the water-valve or plunger. Fig. 8 is a rear view of the gas-valve. Fig. 9 is a plan view of the valve mechanism, showing the heater, including the coiled retort and burners in horizontal section, to illustrate the relative arrangement of said parts. Fig. 10 is a detail horizontal section of the valve mechanism, taken in the plane of the axis of the valve-connecting lever.

Similar numerals of reference indicate corresponding parts in all the figures of the drawings.

1 designates a casing in which is arranged a water-valve or plunger 2, consisting of a tubular shell fitted snugly in the reduced portions of the casing at opposite sides of the enlargement $1^a$ thereof and provided at an intermediate point with a disk or head 3, said tubular shell above and below the plane of the head 3 being slotted, whereby when said head rises above the plane of the lower portion of the enlargement $1^a$ of the casing water is allowed a free passage through the slots and around the head in flowing from the water-inlet 4 to the water-outlet 5, which is in communication in practice with the water conveyer or retort 6 of a water-heater. The flow of water through the valve-casing 1 is controlled, primarily, by a faucet, such as that indicated at 7 in the service-pipe 8, and it is only while this faucet is open to allow the escape of water from the conveyer or retort of the heater that there is any pressure against the under side or inlet side of the disk or head 3, tending to raise the plunger and allow the water to pass from the inlet 4 to the outlet 5. When the faucet is closed or when the flow of water through the retort or conveyer is checked by any other means, the pressure upon opposite sides of the plunger is equalized to allow the plunger to reseat or return to the normal position indicated in Fig. 2 and in full lines in Fig. 3. In practice I preferably employ yielding means for returning this plunger to its normal or seated position, as hereinafter particularly explained.

9 represents a gas-valve casing having an inlet-passage 10 and an outlet-passage 11, between which is arranged a valve-seat 12 to receive a reciprocatory gas-valve 13. This valve may be yieldingly held seated by any suitable means, such as a spring 14, arranged in the upward extension 15 of the gas-valve casing and seated at its upper end against a collar 16, and in order that the tension of this valve or seating spring may be varied to suit the conditions under which the apparatus is used this collar may be threaded for adjustment in the casing extension 15, as shown in Fig. 2, the same being accessible at the upper end of the casing extension by reason of a removable cap 17 closing the same. The valve-seat is provided with a suitable washer 18 or the equivalent thereof and the lower end of the valve with a packing-face 19, which may be of yielding material to insure the efficient closing of the passage to the casing, said packing-face being of annular construction to receive a collar 20 and being held in place by a nut 21, threaded upon said collar.

The plunger or water-valve is connected with the gas-controlling valve by means of an operating-lever consisting of a long arm 22, terminally attached to the water-valve plunger, a short arm 23, terminally connected to the gas-valve, and a connecting-spindle 24, which is common to said arms and is suitably mounted in an offset portion 25 of the casing. Preferably the water and gas valve casings are connected and are formed in a single casting, and the offset portion 25, which is in communication with the guideway of the gas-valve 13, is extended to connect with the water-valve casing and form a housing 26, in which said long arm 22 operates, whereby all parts of the valve mechanism are inclosed and thus protected from injury by contact with adjacent objects. The lever-arms 22 and 23 are provided at their spindle ends with eyes or openings for the reception of the spindle, and these eyes are secured in the desired positions with relation to the spindle by set-screws 27 and 28, which are accessible by reason of removable plugs 29 and 30, fitted in openings in the offset 25. In the construction illustrated the long arm 22 of the connecting-lever is bifurcated at its extremity, as shown at 31, to engage a transverse pin 32 in the plunger 2, and the short arm 23 of said lever is similarly bifurcated, as shown at 33, to engage suitable openings 34 in the gas-valve at opposite sides of the axis or longitudinal center thereof. This bifurcation of the short arm of the lever is desirable in order to accommodate the axially-located stem 35 of a regulating-plug 36, which is carried by the gas-valve and operates in a throat 37 in communication with the inlet-passage 10 of the gas-valve casing or chamber. Said regulating-valve is of conical or tapered construction, the upper side thereof being recessed to receive the nut 21 and the contiguous extremity of the collar 20, and the stem 35 is threaded in the central bore of the gas-valve for adjustment to vary the position of the regulating-plug with relation to the lower end of the gas-valve. The gas-valve has a limited throw, which, however, is sufficient to wholly open communication between the inlet and outlet passages of the gas-chamber; but the regulating-plug, which in diameter at its base approximates that of the throat 37, may be so adjusted with relation to the lower end of the valve as to be wholly withdrawn from the throat 37 when the valve is unseated or to remain partly or wholly within said throat, and thus obstruct to a greater or less extent the passage of gas from the inlet-port to the outlet-port of the chamber. In other words, the flow of gas through the gas-chamber is regulated by the adjustment of the regulating-plug 36 with relation to the valve, and consequently with relation to the throat 37, in which said plug operates, the opening between the periphery of the regulating-plug and the wall of the throat 37 being annular and being varied in width by the position which the plug occupies in the throat when the valve is unseated. The collar 16 is preferably hollow or constructed with an open center, through which the upper portion of the stem 35 projects to within convenient reach of the upper end of the casing extension 15, whereby upon removal of the cap 17 said stem may be turned to vary the adjustment of the regulating-plug with relation to the valve 13.

From the foregoing description it will be seen in the first place that the spindle 24, by which the lever-arms are connected for simultaneous movement, has a very slight throw by reason of the movement of the plunger 2, and hence but little opposition is offered to the movement of the valves under the pressure of the water in the casing 1 when the outlet-faucet is opened; but in order that this friction may be reduced to the minimum, while at the same time the communication of water from the housing or water-valve-casing extension 26 to the gas-valve-casing extension 25 may be prevented, I employ a single bearing for the spindle in the wall between said extensions and provide such bearing with a stuffing-box 38. As this is the only point of possible communication between the water and gas valve casings, a single stuffing-box is sufficient with the construction described to prevent such communication. It will be seen that owing to the single bearing for the spindle the friction due to the movement of the parts of the mechanism is minimized, and hence that a delicate adjustment of the parts may be maintained to allow the operation of the gas-valve to be accomplished by a very light water-pressure in the casing 1. The desirability of this reduction of friction to the minimum will be obvious to those skilled in the art in that the unseating of the gas-valve should be accomplished promptly with the opening of the outlet-faucet, either wholly or in part, in order that the heater may be brought into operation to supply water at the desired temperature. The seating of the valves upon the cutting off of the supply at the faucet is accomplished by means of the seating-spring 14, which, operating through the gas-valve and the connecting-lever, returns the water-valve or plunger 2 to its seated or closing position, as shown in Fig. 2.

In order that the gas admitted to the burners 6ª of the heater may be ignited promptly and automatically when the faucet is opened, any suitable pilot-jet may be employed having connection with any suitable part of the apparatus or with an auxiliary supply to preserve a continuous flame; but in the drawings I have deemed it sufficient to illustrate a jet 39 having communication by a tube 39ª with the inlet-passage 10 of the gas-valve chamber. It will be understood, furthermore, that the mechanism described possesses a graduated feature, owing to the fact that the opening of the gas-valve is controlled by the water-actuated plunger, and obviously that the extent of opening of the gas-valve is proportionate to the extent of movement of the water-actuated plunger, and hence is proportionate to the force or head of the water. Therefore if the faucet 7 in communication with the mechanism is open but slightly the flow of water through the device will be comparatively slight, and hence will raise the plunger only a sufficient distance to allow the necessary supply to the faucet, and this small opening of the plunger will be accompanied by a correspondingly-small opening of the gas-valve, and hence a small amount of gas will be supplied to the burners, whereas a full opening of the faucet will allow the full head of the water to actuate the plunger, and if this is sufficient to raise the plunger to its limited movement the gas-valve will be fully opened. Furthermore, the described arrangement of the regulating-plug upon the fluid-controlling valve and adjustable with relation thereto provides for the adjustment of said plug without unseating the valve. It will be seen that the means of adjustment, consisting of the stem, is accessible at the rear of the valve and through the capped opening in the cylindrical guide of the valve-casing, whereby when the valve is seated the rear end of the guide may be opened and the stem turned to adjust the plug either toward or from the plane of the face of the valve to cause either a greater or less flow of gas when the valve is unseated.

It is obvious that various changes in the form, proportion, and the minor details of construction may be resorted to without departing from the spirit or sacrificing any of the advantages of this invention.

Having described my invention, what I claim is—

1. An automatic controlling-valve, substantially such as described, comprising a casing having separate water and gas passages and the independent chambers offset from said passages and divided one from the other by an intervening wall, the latter provided with a single bearing, a valve-plunger in the water-passage and exposed therein to variable fluid-pressure, a gas-controlling valve in the gas-passage, a spindle journaled in the bearing of the dividing-wall and terminating within the water and gas chambers of the casing, lever-arms connected to the water-plunger and the gas-valve, respectively, and secured to opposite end portions of the spindle, said spindle and the lever-arms being housed wholly within the chambers of the casing, and means for forcing the valves to their seats on a reduction of pressure in the water-passage, substantially as set forth.

2. An automatic controlling-valve, substantially as described, comprising a casing having separate water and gas passages, a plunger-valve having a pressure-head and slotted portions of unequal area on opposite sides of the head, said plunger-valve being arranged in the water-passage of said casing to be exposed solely to variable fluid-pressure therein and unseated automatically to variable positions by variation in the pressure and volume of water flowing through such passage, a gas-controlling valve in the gas-passage, operative connections between the water-plunger and the gas-valve to unseat the latter proportionately to the movement given automatically to the water-plunger by the variations in the pressure of water thereon, and a retracting device acting solely on the gas-valve to seat the latter and through the operative connections also seat the water-plunger when the water ceases to flow through the water-passage, substantially as set forth.

3. In a controlling-valve mechanism, substantially such as described, having a plunger exposed at opposite sides to relatively-variable fluid-pressures, a gas-controlling valve yieldingly held seated, and means connecting said plunger and valve for moving the latter proportionately to the former, combined with a regulating-plug carried by the gas-valve and operable in a gas-passage, and means adjustably connecting the plug with the gas-valve to vary the area of the port provided when the valve is moved to a given position from its seat, said regulating-plug being adjustable to variable positions relative to the gas-valve independent of the travel imparted to the latter by the means connecting the same with the water-plunger, substantially as set forth.

4. A controlling-valve mechanism having a plunger exposed at opposite sides to relatively-variable liquid-pressures, a gas-controlling valve yieldingly held seated, and a lever having arms of different lengths respectively connected with said plunger and valve, for moving the latter proportionately to the former, in combination with a regulating-plug carried by the valve, and having a stem accessible at the rear of and adjustable with relation to the valve, said plug being of tapered or conical construction, and being arranged to operate in a throat in communication with the port controlled by said valve, whereby the area of the fluid-passage, for a given movement of the valve, may be varied, substantially as specified.

5. A controlling-valve mechanism having a casing, a plunger exposed at opposite sides to relatively-variable liquid-pressures, a gas-controlling valve yieldingly held seated, and a lever having arms of different lengths respectively connected with said plunger and valve, for moving the latter proportionately to the former, in combination with a regulating-plug having a stem extending through and threaded in said valve, and adjustable to vary the area of the fluid-passage for a given movement of the valve, said stem extending to, and being accessible at the back of a valve, and through a cap-fitted opening in the casing, substantially as specified.

6. A controlling-valve mechanism having a plunger exposed to a variable liquid-pressure, a valve-casing having a fluid-port and an extension arranged perpendicular to the plane of a valve-seat adjacent to said port, a valve operating in said extension in operative relation with the port, and yieldingly held seated, a lever for communicating motion from said plunger to the valve, and a regulating-plug carried by the valve and having a stem adjustably fitted in the valve, extending beyond the rear side of the valve and through said casing extension, and terminating adjacent to a removable cap with which the extremity of the casing extension is fitted, substantially as specified.

7. A controlling-valve mechanism having a plunger exposed to a variable fluid-pressure, a valve-casing having a tubular extension 15 provided with a valve-seat and fitted at a point remote from the valve-seat with a removable cap, a fluid-controlling valve arranged in operative relation with said seat and operating in said extension, a centrally-open adjusting-nut threaded in the extension, a valve-seating spring interposed between said nut and the valve, a regulating-plug having a stem threaded in said valve, extending through said spring and the open center of the adjusting-nut, and terminating adjacent to said removable cap of the extension, and a lever connecting the plunger with the valve, substantially as specified.

8. A controlling-valve mechanism having a plunger exposed to variable fluid-pressure, a valve-casing in communication with a gas-channel and having a cylindrical valve-guide provided, at a point remote from the valve-seat, with an access-opening, a fluid-controlling valve arranged in said guide and operatively connected with the plunger, and a regulating-plug mounted upon and adjustable with relation to the valve, for controlling the area of the passage opened by the valve, and provided with a stem extending beyond the rear side of the valve and terminating adjacent to said opening in the guide, said stem being operable independently of the connections from the gas-valve to the plunger for moving the regulating-valve to variable positions relative to the valve-seat, substantially as specified.

9. A controlling-valve mechanism having a plunger exposed to variable fluid-pressure, a fluid-controlling valve having a seating-spring, and a connecting-lever between said plunger and valve, in combination with a spring-adjusting device consisting of a centrally-open collar, and a regulating-plug, operating in a throat in communication with the seat of the valve, and having a stem adjustably mounted upon and carried by the plug, and extending through the open center of said spring-adjusting collar, and accessible, without unseating the valve, to vary the position of the plug in the throat, substantially as specified.

10. In a controlling-valve mechanism, the combination with a casing provided with a water-passage and a gas-passage, a valve in each passage, and means connecting said valves for movement in unison one with the other, of means upon one side of the gas-valve for yieldingly holding the same upon its seat, and a regulating-plug connected adjustably with the other side of the gas-valve and arranged to travel therewith under the adjustment imparted thereto by the devices connecting the same with the water-valve, said regulating-plug being adjustable to variable positions relative to the gas-valve independently of its travel therewith and adapted to vary the area of the gas-passage within certain limits under a given adjustment of the gas-valve, substantially as described.

11. In a controlling-valve mechanism, the combination with a casing provided with a water-passage and a gas-passage, of a cylindrical casing communicating with said gas-passage, the top of said casing having a removable cap, a valve in each passage of the casing, the valve in the gas-passage being extended into said cylindrical casing, means for connecting said valves to move in unison, a regulating-plug on the gas-valve, an adjusting-stem connected to said regulating-plug, a spring seated on the gas-valve, and a hollow collar screwed in the cylindrical casing adjacent to the cap to vary the tension of the spring, said collar also guiding the adjusting-stem for the regulating-plug, substantially as described.

In testimony that I claim the foregoing as my own I have hereto affixed my signature in the presence of two witnesses.

EDWIN ELMER FREDERICK.

Witnesses:
A. D. WILSON,
JOHN L. WILSON.